Oct. 11, 1927.  R. F. ANDERSON  1,644,662
AUTOMOBILE VISOR
Filed June 8, 1925  2 Sheets-Sheet 1

Inventor
Roy F. Anderson
By Frank E. Liverance, Jr.
Attorney.

Oct. 11, 1927.  
R. F. ANDERSON  
AUTOMOBILE VISOR  
Filed June 8, 1925  
1,644,662  
2 Sheets-Sheet 2
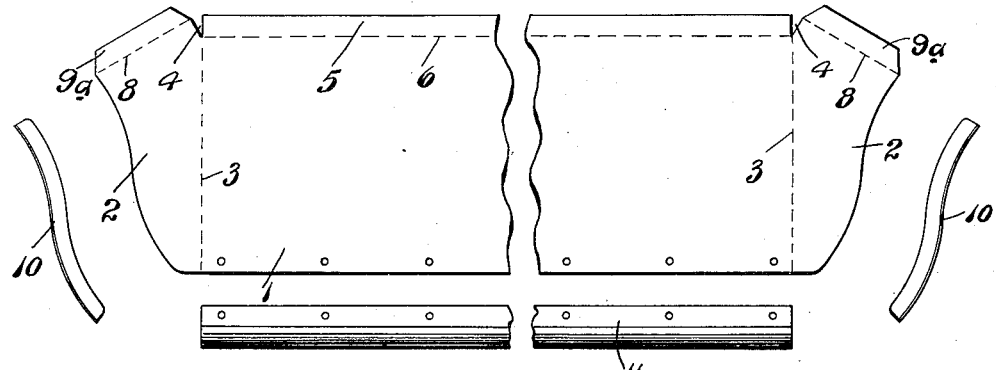
Fig.3.
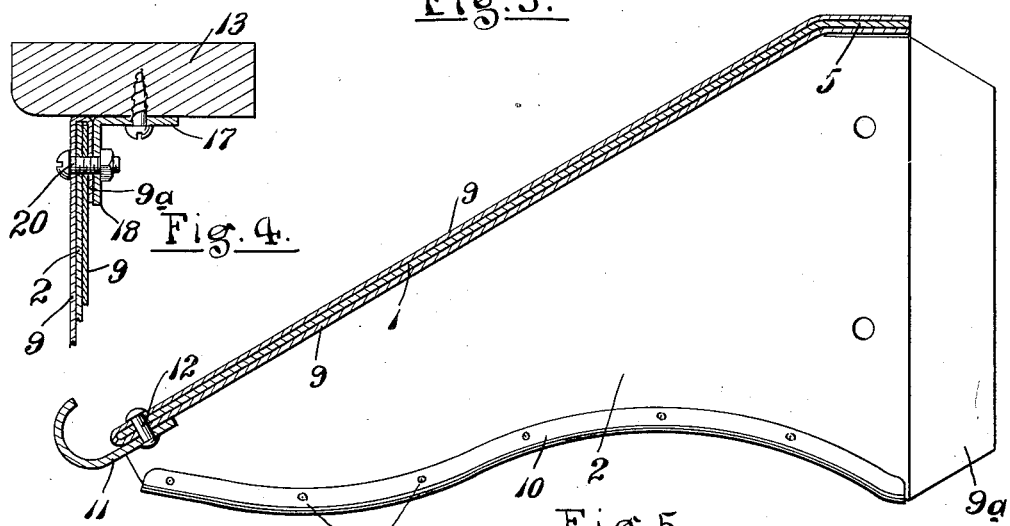
Fig.4.  
Fig.5.
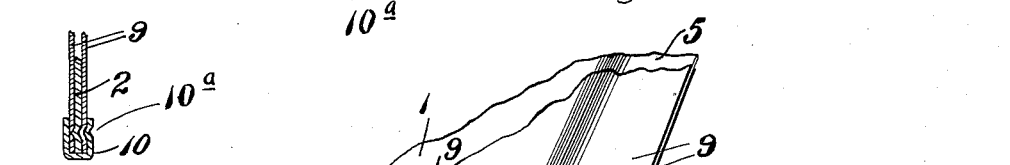
Fig.6.
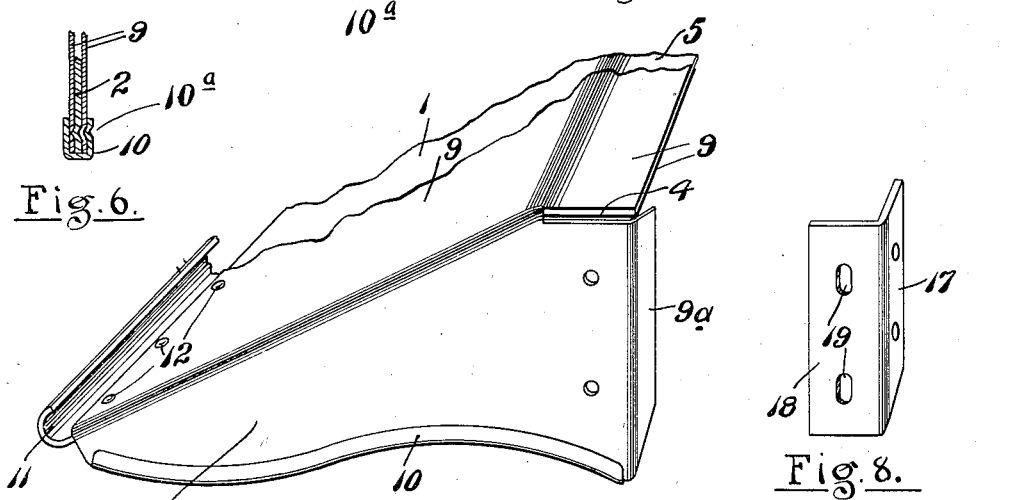
Fig.7.
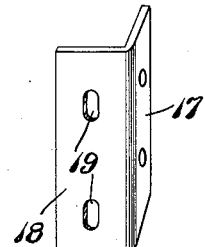
Fig.8.
Inventor  
Roy F. Anderson  
By Frank E. Liverance, Jr.  
Attorney.

Patented Oct. 11, 1927.

1,644,662

UNITED STATES PATENT OFFICE.

ROY F. ANDERSON, OF GRAND RAPIDS, MICHIGAN, ASSIGNOR TO HAYES-IONIA COMPANY, OF GRAND RAPIDS, MICHIGAN, A CORPORATION OF MICHIGAN.

AUTOMOBILE VISOR.

Application filed June 8, 1925. Serial No. 35,545.

This invention relates to a visor adapted to be used with motor vehicles at the front and at the upper portion of the wind shield whereby the driver may be protected to a large extent from the rays of the sun and the wind shield also protected from rain which, directed against the visor does not reach the wind shield.

The present invention relates to a simple and practical construction of visor, one which is very easily made at low cost and which can be very simply and effectively attached in place on the automobile. For an understanding of the invention reference may be had to the following description taken in connection with the accompanying drawings, in which, Fig. 1 is a fragmentary perspective view of the upper front portion of the motor vehicle body showing the visor connected thereto.

Fig. 3 is a plan of the various elements from which the visor is made.

Fig. 4 is a fragmentary enlarged horizontal section at one side of the visor and showing the means used for attaching the same to the vehicle body.

Fig. 5 is an enlarged transverse vertical section through the visor.

Fig. 6 is a fragmentary vertical section at the lower edge of one of the ends of the visor.

Fig. 7 is a fragmentary perspective view of an end portion of the visor, and

Fig. 8 is a perspective view of the bracket attachment used in connecting the visor to the vehicle body.

Like reference characters refer to like parts in the different figures of the drawings.

Figure 1:
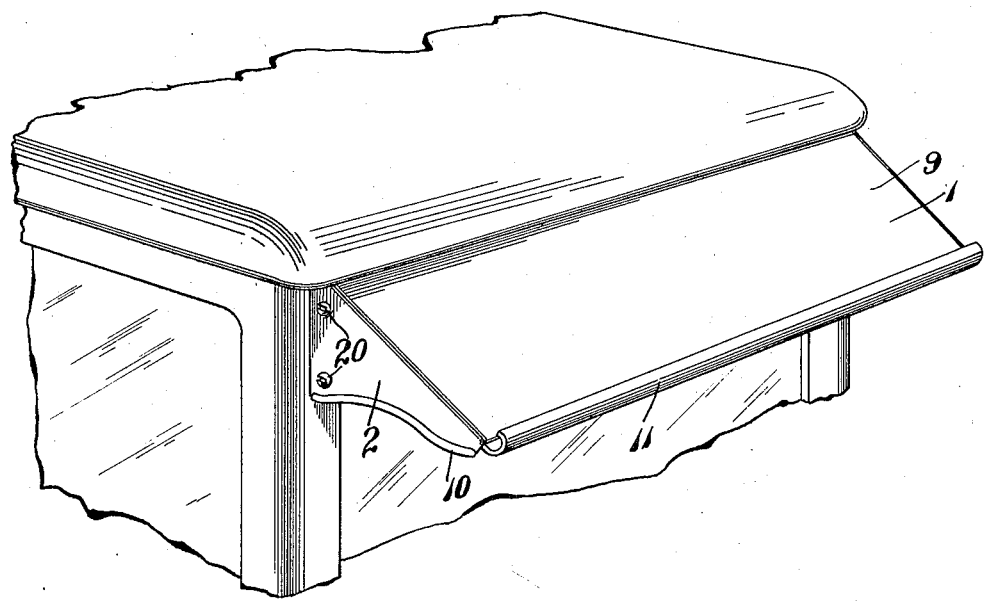

In the construction of the visor a plate of sheet metal is used which is adapted to be covered with fabric glued thereto and permanently secured in place, the sheet metal and fabric after their secure gluing together being formed into the desired shape. The sheet metal includes a body section 1 of rectangular outline considerably longer than it is wide from which, at its end, end sections 2 extend outwardly the same being adapted to be bent at right angles on the dotted lines, indicated at 3 in Fig. 3, for making the ends of the visor. Notches 4, shown in Fig. 3, are made in this metal with its covering attached at each rear corner of the body 1 and the body at its rear edge is provided with a narrow extension 5 which is adapted to be turned or bent on the line 6 shown so that said section 5 lies at an obtuse angle to the body 1 the entire length thereof. The end sections 2 of the metal terminate at the lines 8 shown in Fig. 3 which lie at an angle to the length of the visor.

The fabric which is glued to the visor is glued thereto, as stated, before it is formed into shape. This fabric is indicated at 9 and comprises a continuous sheet which is turned around the lower edge of the body 1 and extended back on both its upper and lower sides to the rear edge of the section 5; while the end sections 2 are completely covered to their edges. And beyond the edges 8 of the metal, the fabric is extended on the outer side of the visor in a flap 9a, as shown.

The single sheet of metal covered with fabric in the manner described is then operated upon in a suitable press so as to bend the ends 2 at right angles to the body 1, bending upon the lines 3, and also bend the part 5 at an obtuse angle to the body 1, as shown in Fig. 7, the projecting flap 9a extending back of the rear edge of each end 2. It will be noted that with the visor thus made the under edges of the ends 2 are not finished due to the fact that the fabric edges are substantially flush with the edges of the metal. This is taken care of by elongated U-shaped finishing clips 10 which are clamped to the ends of the visor completely covering and disguising the raw edges of the fabric. In practice the finishing clips 10 are secured in place by indenting the same at their inner sides by means of a prick punch whereby indentations 10a are formed, the same being carried through to the inner fabric 9 and to the ends 2 of the metal of the visor as shown in Fig. 6, this making a very secure connection and one which will not become loose in service. In addition at the front lower edge of the visor a drain trough 11 formed from a single elongated piece of sheet metal is secured by means of a plurality of rivets 12. This trough, in addition to draining water hitting against the upper side of the visor to one side, serves to strengthen and reinforce the visor and make it of greater strength and rigidity.

Figure 2:
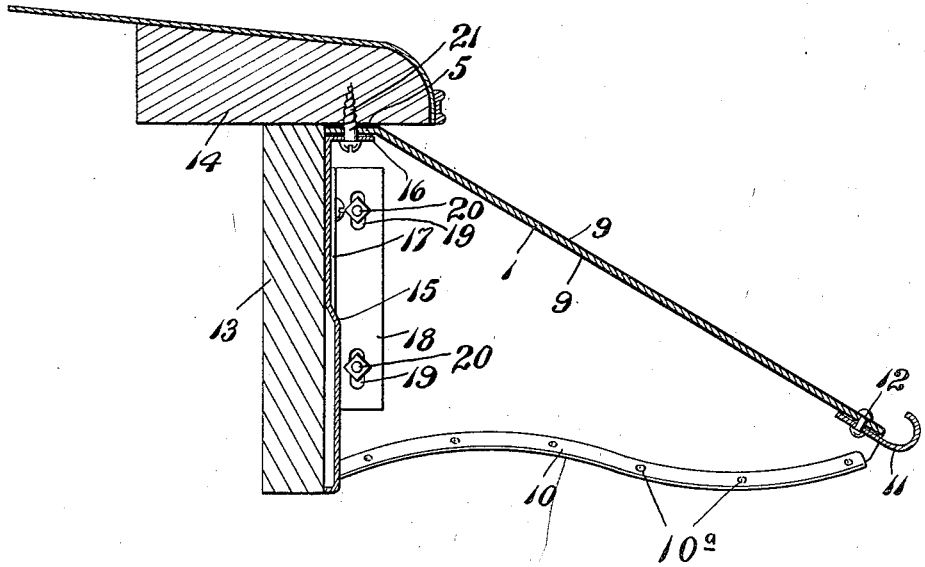
Fig. 2 is an enlarged fragmentary vertical section through said visor and the adjacent portions of the automobile body.

The visor may be attached to the body of the automobile on which it is to be used in any preferred manner. In Fig. 2 I have shown the front upper structure of a vehicle body in sufficient detail to illustrate a preferred form of attachment. The body includes in its construction an upper horizontal rail 13 above which is a second rail 14 located with respect to each other as shown in Fig. 2. The rail 13 is covered at its outer side by sheet metal 15 which at its upper edge is preferably formed with an outturned flange 16 located a short distance below the lower side of the rail 14. This upper rail forms the upper boundary or side of the frame in which the wind shield is located and the vertical side members or posts 13ª of the frame are secured to the rail 13 in any preferred and well-known manner.

Two angle brackets including legs 17 and 18 located at right angles to each other are connected to the wind shield frame at its ends and upper side, the legs 17 lying against the outer sides of the members 13ª and being rigidly secured thereto by means of screws or other suitable connections. The legs 18 project outwardly and are preferably formed with somewhat elongated vertical slots 19 therethrough (see Fig. 8). When the visor is to be applied to the body the rear edges of the ends 2 pass one alongside the outer side of each forwardly projecting leg 18 of the brackets and bolts 20 are passed through the ends of the visor and the brackets, thereby connecting the visor securely to said brackets. It will also be noted that the section 5 which has been bent at an obtuse angle to the main portion of the visor passes between the flange 16 and the under side of the rail 14 to permit screws 21 being passed upwardly through said flange and section 5 into the wood rail 14. This makes a very simple yet practical, durable and secure connection and one which is inexpensive from the standpoint of manufacturing cost.

When thus connected to the vehicle body it will be noted that the raw edges of the fabric at the edge of the section 5 are fully covered and out of sight. It will also be noted that the flaps 9ª are turned around the rear edges of the ends 2 so as to lie between said ends 2 of the visor and the legs 18 of the bracket supports, as shown in Fig. 4, thereby completely covering and disguising the fabric edges at the rear edges of the ends 2 of the visor. The clips 10 complete the device to make it present a particularly pleasing and effective appearance. This construction has been in practical use and has proved its merits by such use. The invention is defined in the appended claims and is to be considered as comprehensive of all forms of structure coming within their scope.

I claim:

1. A device of the character described comprising, a flat body section of sheet metal, integral end sections turned downwardly one at each end of the said body, a fabric covering turned around the outer edge of the body and secured to both sides of the metal and U-shaped clips clamped to the lower edges of said end sections and against the fabric on the inner and outer sides thereof, substantially as described.

2. The combination with a motor vehicle body, including a top and a horizontal rail adjacent thereto, of a vertical covering member on said rail having a horizontal flange parallel with and spaced away from the underside of said top, a visor having a horizontal portion located between said top and said horizontal flange, an integral downwardly inclined portion and vertical end portions and means for holding said horizontal portion in place between said flange and said top.

3. An automobile visor comprising an inclined body member and integrally formed vertical end portions, a fabric covering on both sides of the body and end portions, said outside fabric covering extending beyond the vertical rear edges of the end portions and folded inward and against the inside fabric covering and attaching brackets lying against said inside folded portion of the covering.

4. The combination with a motor vehicle including a top and vertical posts of brackets attached to said posts, a visor formed from sheet metal and including a rear horizontal section, a downwardly and outwardly extending body and an end section at each end of the body turned downwardly at right angles thereto, means passing through said brackets and said end sections to secure the visor to the posts and means passing through said rear horizontal section to secure the visor to the underside of the body top.

5. The method of forming a motor vehicle visor which consists in providing a flat plate of sheet metal and bending a fabric covering around the outer edge of said metal so that the covering covers both the outer and inner sides of the visor, securing said covering to the plate and then bending each end portion of the plate downwardly and at right angles to the main body portion thereof after the fabric covering has been secured in place, substantially as described.

6. A device of the character described comprising, a flat body section of sheet metal, integral end sections turned downwardly one at each end of said body, a fabric covering turned around the outer edge of the body and secured to both sides of the metal, U-shaped clips embracing the lower edges of said end sections and lying against the fabric on the inner and outer sides thereof, and means for securing the clips comprising inwardly pressed indentations in said clips, inner fabric and metal of said ends forming a secure interlock of the clips to said device, substantially as described.

In testimony whereof I affix my signature.

ROY F. ANDERSON.